United States Patent
Kim et al.

(10) Patent No.: US 10,656,322 B2
(45) Date of Patent: May 19, 2020

(54) COHERENT BACKLIGHT UNIT AND THREE-DIMENSIONAL IMAGE DISPLAY DEVICE INCLUDING THE SAME

(71) Applicant: SAMSUNG ELECTRONICS CO., LTD., Suwon-si (KR)

(72) Inventors: Yunhee Kim, Seoul (KR); Hoon Song, Yongin-si (KR); Sunil Kim, Seoul (KR); Seokho Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 15/413,526

(22) Filed: Jan. 24, 2017

(65) Prior Publication Data

US 2017/0248747 A1    Aug. 31, 2017

(30) Foreign Application Priority Data

Feb. 26, 2016    (KR) .................. 10-2016-0023646

(51) Int. Cl.
| | |
|---|---|
| *F21V 8/00* | (2006.01) |
| *G03H 1/22* | (2006.01) |
| *G02B 6/34* | (2006.01) |
| *G02B 30/27* | (2020.01) |

(52) U.S. Cl.
CPC ........... *G02B 6/005* (2013.01); *G02B 6/0055* (2013.01); *G02B 6/0068* (2013.01); *G02B 6/34* (2013.01); *G02B 30/27* (2020.01); *G03H 1/2286* (2013.01); *G03H 2223/16* (2013.01)

(58) Field of Classification Search
CPC .... G02B 6/005; G02B 6/0055; G02B 6/0068; G02B 27/2214

USPC ....................................................... 362/97.1
See application file for complete search history.

(56) References Cited

U.S. PATENT DOCUMENTS

| | | | |
|---|---|---|---|
| 5,224,198 A * | 6/1993 | Jachimowicz ......... | G02B 6/003 359/13 |
| 5,854,697 A | 12/1998 | Caulfield et al. | |
| 7,253,799 B2 | 8/2007 | Lee et al. | |
| 8,325,166 B2 * | 12/2012 | Akutsu .................. | G02B 5/203 345/204 |
| 2006/0228073 A1* | 10/2006 | Mukawa .............. | G02B 6/0033 385/31 |
| 2007/0070504 A1* | 3/2007 | Akutsu ................ | G02B 5/1861 359/573 |
| 2007/0188837 A1* | 8/2007 | Shimizu ................ | G02B 5/203 359/13 |
| 2009/0141324 A1* | 6/2009 | Mukawa .............. | G02B 5/1814 359/13 |

(Continued)

FOREIGN PATENT DOCUMENTS

| | | |
|---|---|---|
| KR | 1020150048402 A | 5/2015 |
| KR | 10-2016-0026570 A | 3/2016 |

*Primary Examiner* — Elmito Breval
(74) *Attorney, Agent, or Firm* — Sughrue Mion, PLLC

(57) ABSTRACT

A coherent backlight unit and a 3D image display device including the coherent backlight unit are provided. The coherent backlight unit includes a light source, a light guide plate, a first diffraction grating, a second diffraction grating, and a reflective optical element. The light source irradiates a coherent light and the reflective optical element reflects the coherent light that is propagating toward one of the side surfaces from the inner side of the light guide plate toward the inner side of the light guide plate.

15 Claims, 12 Drawing Sheets

(56) References Cited

U.S. PATENT DOCUMENTS

| | | | |
|---|---|---|---|
| 2010/0027289 A1* | 2/2010 | Aiki | G02B 6/0011 |
| | | | 362/558 |
| 2010/0157433 A1* | 6/2010 | Mukawa | G02B 27/0172 |
| | | | 359/633 |
| 2012/0127577 A1* | 5/2012 | Desserouer | G02B 27/0101 |
| | | | 359/566 |
| 2013/0128611 A1* | 5/2013 | Akutsu | G02B 5/09 |
| | | | 362/607 |
| 2014/0204438 A1* | 7/2014 | Yamada | G02B 27/0172 |
| | | | 359/32 |
| 2015/0062715 A1* | 3/2015 | Yamada | G02B 5/1847 |
| | | | 359/630 |
| 2015/0260994 A1* | 9/2015 | Akutsu | G02B 6/34 |
| | | | 359/567 |
| 2016/0065955 A1 | 3/2016 | Kim et al. | |
| 2016/0091648 A1* | 3/2016 | Bang | G02B 6/005 |
| | | | 362/607 |
| 2016/0124223 A1* | 5/2016 | Shinbo | G02B 27/0101 |
| | | | 385/37 |
| 2016/0154243 A1* | 6/2016 | Aiki | G02B 17/00 |
| | | | 359/633 |

* cited by examiner

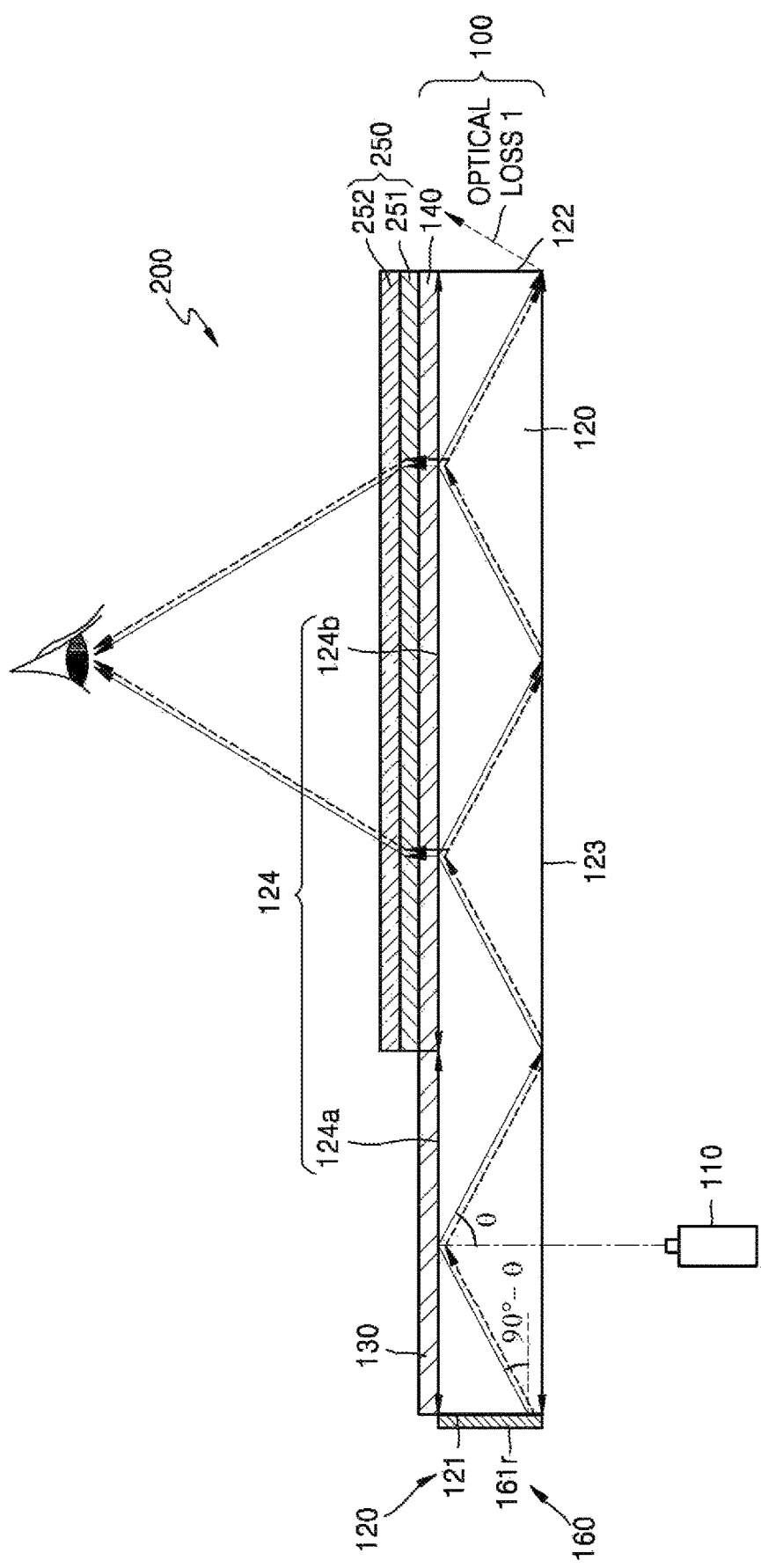

COHERENT BACKLIGHT UNIT AND THREE-DIMENSIONAL IMAGE DISPLAY DEVICE INCLUDING THE SAME

CROSS-REFERENCE TO RELATED APPLICATION

This application claims priority from Korean Patent Application No. 10-2016-0023646, filed on Feb. 26, 2016, in the Korean Intellectual Property Office, the disclosure of which is incorporated herein by reference in its entirety.

BACKGROUND

1. Field

Exemplary embodiments relate to coherent backlight units and three-dimensional image display devices having the coherent backlight units.

2. Description of the Related Art

Recently, many three-dimensional (3D) movies have been released, and accordingly, many technical studies related to 3D images have been conducted. A currently commercialized 3D image display device uses binocular parallax to respectively provide a left-eye image and a right-eye image having different viewpoints from each other to the left eye and right eye of a viewer so that the viewer can perceive a 3D effect. The 3D image display device may be a glass-type 3D image display device that requires use of a special type of glasses or a glass-free type 3D image display device that does not require use of glasses. Another type of a 3D image display device is a holographic device that displays a 3D image by using a hologram.

With regard to the glass-type 3D image display device, red-green glasses are typically used in a theater. In the case of TVs, the glass-type 3D image display device may be a polarized glass system or a liquid crystal shutter system. A glass-free type 3D image display device may include a barrier system, a Lenticular system, or a directional backlight unit system according to the structure of the glass-free 3D image display device. According to a method of forming a 3D, the glass-free 3D image display device may use any of a multiview rendering method, a volumetric method in which all information of a 3D space is displayed as voxels in the 3D space, and an integral imaging method in which, after taking images at various angles by focusing through a lens in a compound eye-shape like that of an insect (e.g., fly's eyes), the images are displayed in a reverse order.

SUMMARY

Provided are coherent backlight units including a reflective optical element and 3D image display that includes the coherent backlight units and thus has increased optical efficiency.

Additional aspects will be set forth in part in the description which follows and, in part, will be apparent from the description, or may be learned by practice of the presented exemplary embodiments.

According to an aspect of an exemplary embodiment, a coherent backlight apparatus includes: a light source configured to irradiate a coherent light; a light guide plate that has a first flat panel surface and a second flat panel surface that face each other; a first diffraction grating provided on either the first flat panel surface or the second flat panel surface and configured to diffract the coherent light irradiated from the light source toward an inner side of the light guide plate; a reflective optical element provided on at least one of a plurality of side surfaces of the light guide plate and configured to reflect the coherent light that propagates toward one of the side surfaces from the inner side of the light guide plate toward the inner side of the light guide plate; and a second diffraction grating provided on the first flat panel surface and configured to discharge the coherent light that is totally reflected by the light guide plate to the outside of the light guide plate.

The reflective optical element may include a mirror surface or a retro-reflective surface.

The retro-reflective surface may be provided on only a side surface of the light guide plate.

The first diffraction grating may be provided on a first region of the first flat panel surface and the second diffraction grating may be provided on a second region of the first flat panel surface.

The light source may be positioned so that the coherent light enters the light guide plate through a second flat panel surface facing the first flat panel surface of the light guide plate.

The first diffraction grating and the second diffraction grating may be close to each other, i.e., may be positioned within a predetermined threshold distance from each other.

The first diffraction grating may be provided on a first region of the second flat panel surface, and the second diffraction grating may be provided on a second region of the first flat panel surface so as not to face the first region.

The first and second diffraction gratings may be formed so that an entrance angle of the coherent light with respect to the light guide plate and an exit angle of the coherent light discharged from the second diffraction grating correspond to each other.

When the light source irradiates the coherent light to be perpendicular to the first diffraction grating, the second diffraction grating may discharge the coherent light toward the second diffraction grating.

When the light source irradiates the coherent light at an entrance angle between $-\theta_{in}$ and $+\theta_{in}$ with respect to a perpendicular direction with respect to a surface of the light guide plate, an exit angle of the coherent light discharged via the second diffraction grating may be between $-\theta_{out}$ and $+\theta_{out}$.

When the entrance angle of the coherent light is $-\theta_{in}$, the exit angle of the coherent light may be $-\theta_{out}$, and when the entrance angle of a coherent light is $+\theta_{in}$, the exit angle of the coherent light may be $+\theta_{out}$.

The coherent backlight apparatus described above may satisfy the condition of $\theta_{in}=\theta_{out}$.

The light source may include a red color light source, a blue color light source, and a green color light source.

The coherent backlight apparatus may further include a collimator disposed in front of the light source.

The coherent backlight apparatus may further include a beam expander disposed in front of the light source.

According to an aspect of an exemplary embodiment, a coherent backlight apparatus includes: a light source configured to irradiate a coherent light; a light guide plate that has a flat panel shape; a first diffraction grating provided on a flat panel surface of the light guide plate and configured to diffract the coherent light irradiated from the light source toward an inner side of the light guide plate; a second diffraction grating provided on a flat panel surface of the light guide plate and configured to discharge the coherent light that is totally reflected by the light guide plate to the outside; and a retro-reflective surface provided at least on one of a plurality of side surfaces of the light guide plate and configured to form a single optical path for the coherent light that is totally reflected by the light guide plate.

According to an aspect of an exemplary embodiment, a 3D image display device includes a coherent backlight apparatus described above and a display panel.

The display panel may include a display element layer configured to modulate a coherent light discharged from the coherent backlight apparatus in response to a reception of image information and a lens configured to form a viewing window by focusing the coherent light.

The display panel may include: a display element layer configured to modulate a coherent light discharged from the coherent backlight apparatus in response to a reception of image information; and a lens configured to focus the coherent light and provide a left-eye image and a right-eye image which are different from each other to a left eye and a right eye of a viewer, respectively, according to an exit angle of the coherent light discharged from the coherent backlight apparatus.

BRIEF DESCRIPTION OF THE DRAWINGS

These and/or other aspects will become apparent and more readily appreciated from the following description of the exemplary embodiments, taken in conjunction with the accompanying drawings in which:

FIG. 2 is a schematic cross-sectional view of a three-dimensional (3D) image display device having the coherent backlight unit of FIG. 1A;

DETAILED DESCRIPTION

Figure 1A:
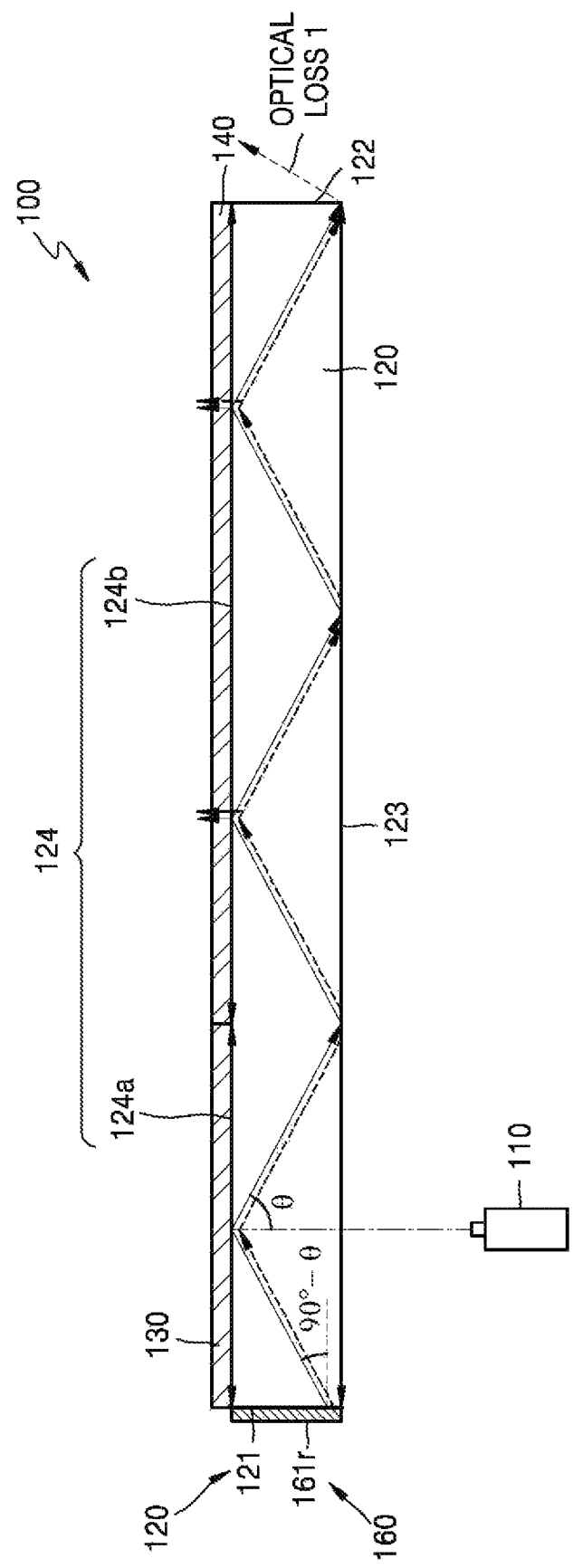
FIG. 1A is a schematic cross-sectional view of a coherent backlight unit, according to an exemplary embodiment.

Hereinafter, a coherent backlight unit and a three-dimensional (3D) image display device according to an exemplary embodiment will now be described with the accompanying drawings.

Features of the present inventive concept and methods of accomplishing the same may be clearly understood by referring to the exemplary embodiments described below and the accompanying drawings. However, the present inventive concept is not limited to the exemplary embodiments disclosed below. The exemplary embodiments may, however, be embodied in many different forms and should not construed as limited to the exemplary embodiments set forth herein. Rather, these exemplary embodiments are provided so that this disclosure will be thorough and complete, and will fully convey the scope of the present inventive concept to those of ordinary skill in the art. The exemplary embodiments will be defined by the appended claims. Like reference numerals are used to like elements throughout the specification. In the drawings, the thicknesses of layers and regions are exaggerated for clarity, and also, portions irrelevant to the description are omitted for convenience of explanation. Expressions such as "at least one of," when preceding a list of elements, modify the entire list of elements and do not modify the individual elements of the list.

Figure 1B:
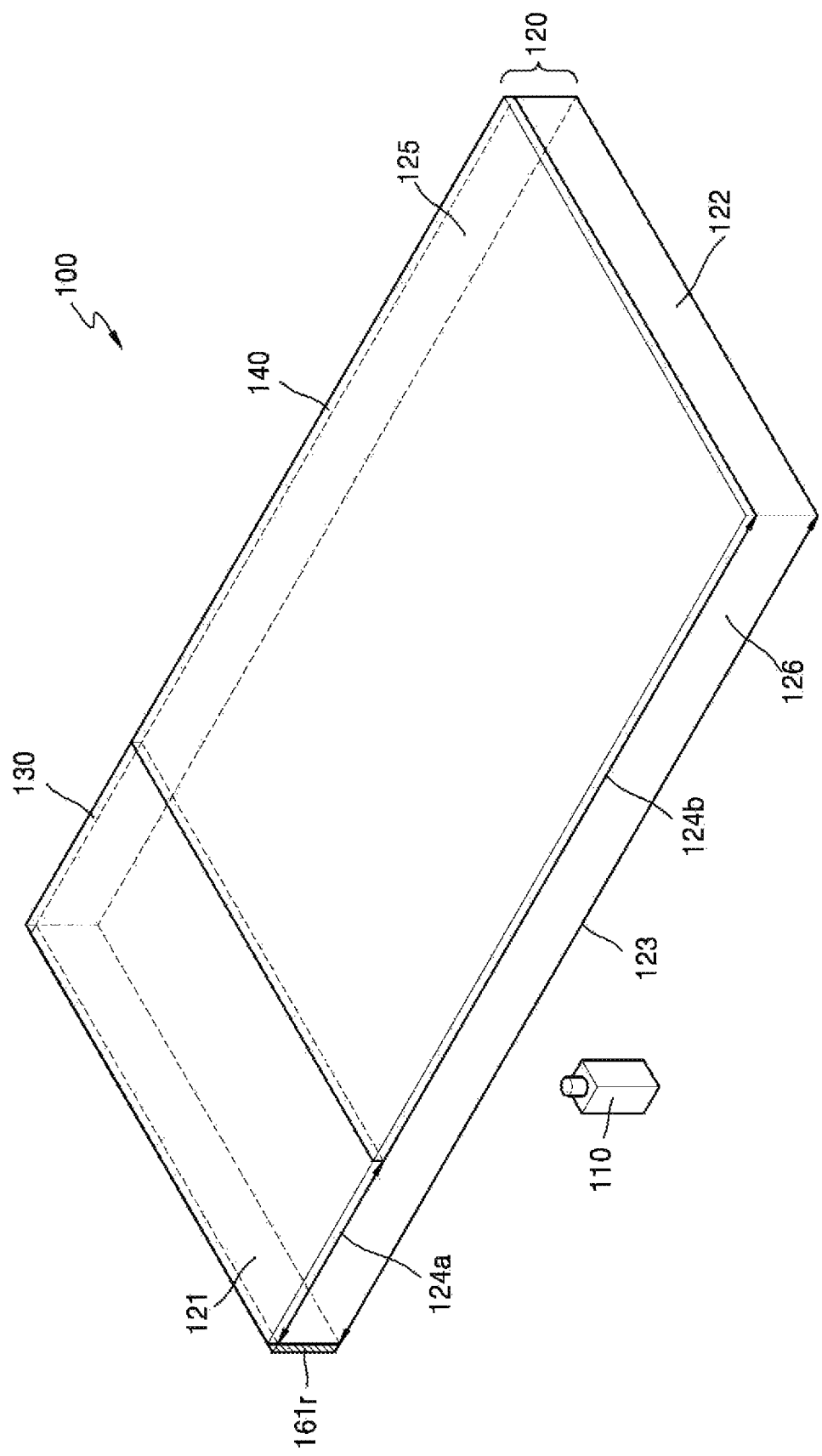
FIG. 1B is a schematic perspective view of the coherent backlight unit of FIG. 1A, according to an exemplary embodiment.

FIG. 1A is a schematic cross-sectional view of a coherent backlight unit (also referred to herein as a "coherent backlight apparatus") 100, according to an exemplary embodiment. FIG. 1B is a schematic perspective view of the coherent backlight unit 100, according to an exemplary embodiment.

Referring to FIGS. 1A and 1B, the coherent backlight unit 100 may include a light guide plate 120 and reflective optical elements 160 on first, second, third, and fourth side surfaces 121, 122, 125, and 126 of the light guide plate 120.

A light source 110 may irradiate a coherent light. Coherency denotes a characteristic of light that causes a constructive interference or a destructive interference when lights overlap with each other. For example, the coherent light may be light that has a constant phase difference regardless of time. For example, the light source 110 may be a laser diode or a solid laser. The light source 110 may include mono-color light sources that emit respective lights of different colors from each other. For example, the light source 110 may include a red color light source (not shown) that emits red color light, a blue color light source (not shown) that emits blue color light, and a green color light source (not shown) that emits green color light. According to another exemplary embodiment, the light source 110 may include a mono-color light source of a single color. Further, according to another exemplary embodiment, the light source 110 may include a variable light source that may emit light of different colors.

The light guide plate 120 may have a flat panel shape. Referring to FIG. 1B, the light guide plate 120 has a rectangular shape, but the shape of the light guide plate 120 is not limited thereto. For example, the light guide plate 120 may have a curved shape which is formed by gently bending a flat panel of a rectangular shape. For example, the light guide plate 120 may include a first flat panel surface 124 and a second flat panel surface 123 that are relatively wider than each of the first, second, third, and fourth side surfaces 121, 122, 125, and 126. The first flat panel surface 124 and the second flat panel surface 123 may face each other. For example, the first flat panel surface 124 and the second flat panel surface 123 may be parallel to each other. The first side surface 121 and the second side surface 122 may face each other. For example the first side surface 121 and the second side surface 122 may be parallel to each other. The third side surface 125 and the fourth side surface 126 may face each other. The third side surface 125 and the fourth side surface 126 may be parallel to each other.

The light guide plate 120 may include a transparent material with respect to a coherent light. For example, the light guide plate 120 may include a glass material or a plastic material.

The light source 110 may be disposed to irradiate light with respect to the second flat panel surface 123 of the light guide plate 120. For example, the light source 110 may be disposed in close proximity to the second flat panel surface 123 of the light guide plate 120. The coherent light may enter a portion of the second flat panel surface 123. The portion of the second flat panel surface 123 may be a region that faces a first region 124a of the first flat panel surface 124.

A first diffraction grating 130 may be provided on the first flat panel surface 124 or the second flat panel surface 123. For example, the first diffraction grating 130 may be provided on the first region 124a of the first flat panel surface 124 or on a third region 123a of the second flat panel surface 123 that faces the first region 124a of the first flat panel surface 124. In the current exemplary embodiment, the first diffraction grating 130 is provided on the first region 124a of the first flat panel surface 124, but is not limited thereto. The case wherein the first diffraction grating 130 is provided on the third region 123a will be described below with reference to FIG. 9. The first diffraction grating 130 may diffract a coherent light. According to the current exemplary embodiment, a reflective coating for reflecting the coherent light toward an inner side of the light guide plate 120 may be provided on an external surface of the first diffraction grating 130. The first diffraction grating 130 may include a repetitive grating pattern, however, the grating pattern is not limited thereto. For example, the first diffraction grating 130 may have a pattern, such as any of a corrugate shape grating pattern, a saw teeth-shape grating pattern, or a trigonometrical shape grating pattern. A width of the first diffraction grating 130 may be sufficiently wide because, although a diameter of a coherent light irradiated from the light source 110 is relatively large, the coherent light may enter all of the first diffraction grating 130.

A second diffraction grating 140 may be provided on the first flat panel surface 124. The second diffraction grating 140 may be provided on a second region 124b of the first flat panel surface 124. The second diffraction grating 140 may discharge a coherent light that propagates through an inner side of the light guide plate 120 to the outside of the light guide plate 120. At this point, the second diffraction grating 140 may diffract the coherent light to have a constant angle with respect to the second region 124b. The second diffraction grating 140 may include a repetitive grating pattern, and the practical example of the grating pattern is not limited thereto. For example, the second diffraction grating 140 may have a pattern, such as any of a corrugate shape grating pattern, a saw teeth-shape grating pattern, or a trigonometrical shape grating pattern. The greater a width of the second diffraction grating 140, the larger a width of a display panel (referring to 250 of FIG. 2) provided on the second diffraction grating 140.

FIG. 2 is a schematic cross-sectional view of a three-dimensional (3D) image display device 200 that includes the coherent backlight unit 100 of FIGS. 1A and 1B. Referring to FIG. 2, a display panel 250 may be provided on a second diffraction grating 140. The display panel 250 may include a display element layer 252 that is configured to modulate a coherent light discharged from the second diffraction grating 140 in response to a reception of image information and a lens 251 that is configured for focusing the coherent light discharged from the second diffraction grating 140. Referring to FIG. 2, the lens 251 and the display element layer 252 may be sequentially formed on the second diffraction grating 140, but the formation is not limited thereto. For example, the display element layer 252 and the lens 251 may be sequentially formed on the second diffraction grating 140. The display panel 250 may additionally include a color filter layer (not shown). The color filter layer (not shown) may be disposed, for example, between the display element layer 252 and the lens 251, but the location of the color filter layer (not shown) is not limited thereto.

The display element layer 252 may include a spatial light modulator (SLM) that is generally used in 3D image display devices. The SLM may include well-known elements. For example, the display element layer 252 may use any of a digital micro-mirror device (DMD), a liquid crystal on silicon (LCoS), or a semiconductor optical modulator. Further, the display element layer 252 may include a Complex Spatial Light Modulator that modulates both phase and amplitude and a Phase Spatial Light Modulator that modulates phase.

The display element layer 252 may form a hologram pattern in response to a hologram data signal received from a controller (not shown) on a surface thereof. A coherent light that enters the display element layer 252 is diffracted and modulated into a holographic wavefront image by a hologram pattern. The diffracted light forming a holographic wavefront image may form a hologram image on a viewing window (VW) by diffraction interference through the lens 251. The VW may be understood as a space where a viewer may view a hologram image.

The lens 251 may focus a coherent light discharged from the second diffraction grating 140 with a constant angle. For example, the lens 251 may be an optical device that focuses a coherent light. For example, the lens 251 may be a convex lens. The lens 251 focuses a hologram image formed on the display element layer 252 in front of a pupil of a viewer, and thus, a VW may be formed in front of the pupil of the viewer.

Figure 3:
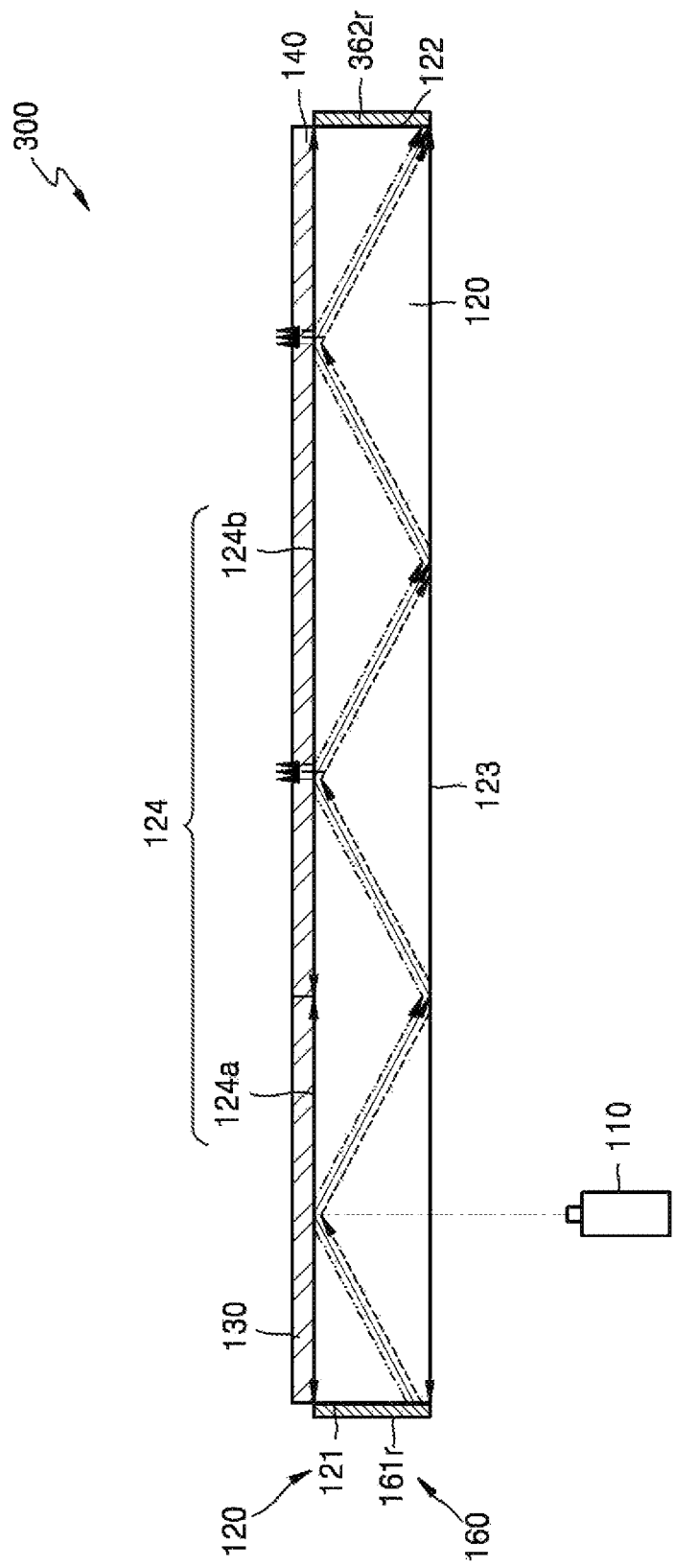
FIG. 3 is a schematic cross-sectional view of a coherent backlight unit, according to another exemplary embodiment.

FIG. 3 is a schematic cross-sectional view of a coherent backlight unit 300, according to another exemplary embodiment. Retro-reflective surfaces that face each other may be provided on the first, second, third, and fourth side surfaces 121, 122, 125, and 126 of FIG. 1B. For example, a retro-reflective surface 161r and a retro-reflective surface 362r respectively are provided on the first side surface 121 and the second side surface 122 that are facing each other. For example, retro-reflective surfaces may be respectively provided on the third side surface 125 (refer to FIG. 1B) and the fourth side surface 126 (refer to FIG. 1B) that face each other. The configuration of the coherent backlight unit 300 according to the current exemplary embodiment is substantially the same as that of the coherent backlight unit 100 of FIG. 1A and FIG. 1B except the retro-reflective surfaces 161r and 362r, and thus, the descriptions thereof will not be repeated.

The retro-reflective surface 161r on the first side surface 121 and the retro-reflective surface 362r on the second side surface 122 may prevent light leakage by reflecting a coherent light that propagates toward the first, second, third, and fourth side surfaces 121, 122, 125, and 126 of FIG. 1B. The coherent backlight unit 300 according to the current exemplary embodiment may form a single optical path in the light guide plate 120. The coherent backlight unit 300 according to the current exemplary embodiment may prevent a loss 1 when compared to the coherent backlight unit 100 of FIGS. 1A and 1B, and thus, the coherent backlight unit 300 according to the current exemplary embodiment may have a relatively high optical efficiency.

Figure 4:
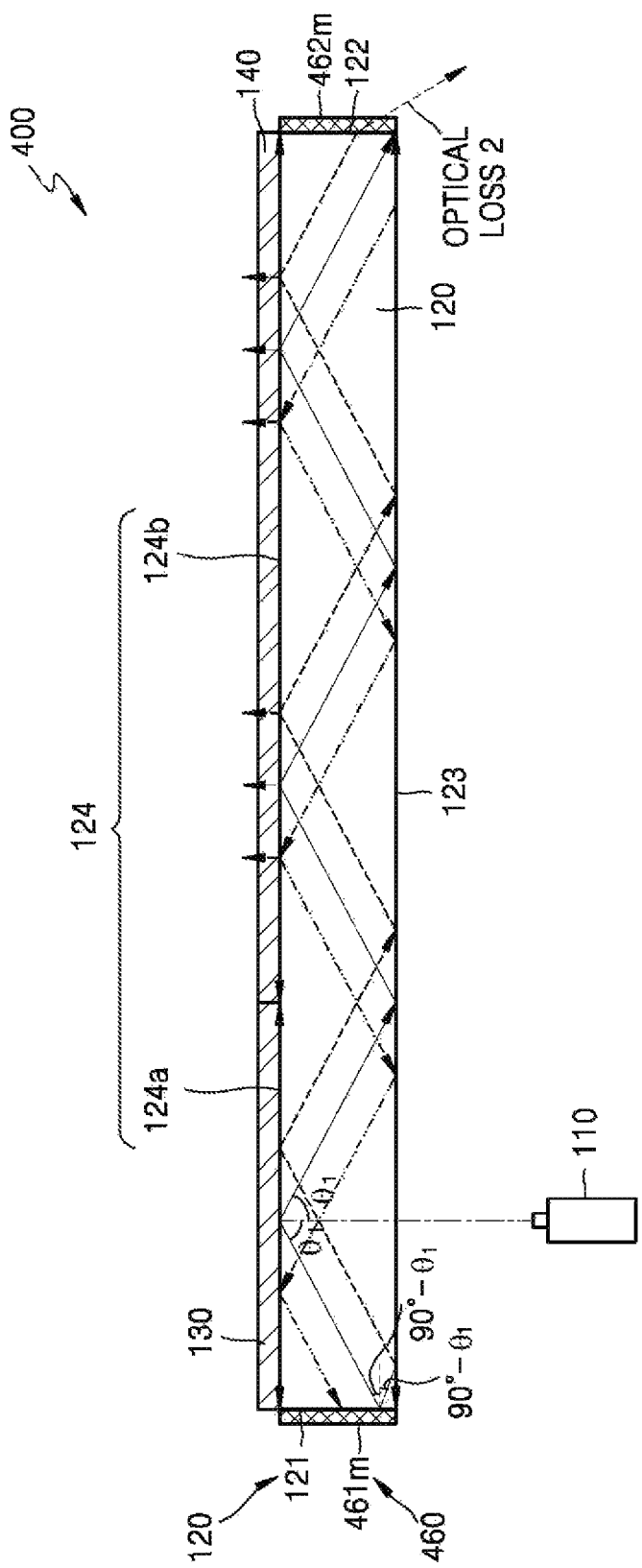
FIG. 4 is a schematic cross-sectional view of a coherent backlight unit, according to another exemplary embodiment.

FIG. 4 is a schematic cross-sectional view of a coherent backlight unit 400, according to another exemplary embodiment. A mirror surface may be provided on at least one side surface of the side surfaces 121, 122, 125, and 126 of FIG. 1B. Referring to FIG. 4, a mirror surface 461m may be provided on the first side surface 121 and/or a mirror surface 462m may be provided on the second side surface 122. The configuration of the coherent backlight unit 400 according to the current exemplary embodiment is substantially the same as the coherent backlight unit 100 of FIGS. 1A and 1B except for the mirror surfaces 461m and 462m, and thus, the detailed descriptions thereof will not be repeated.

The mirror surface 461m on the first side surface 121 may prevent an optical loss of a coherent light that reaches the first side surface 121. The mirror surface 461m may reflect an incident coherent light so that an entrance angle and reflection angle are the same. The coherent light reflected at the first side surface 121 may form an additional optical path that is parallel to an existing optical path. A coherent light that reaches the second side surface 122 via the additional optical path may be discharged outside of the light guide plate 120 if the mirror surface 462m is not formed, and thus, an optical loss 2 may occur. When the mirror surface 462m is formed on the second side surface 122, the optical loss 2 may be prevented. The coherent light that is retro-reflected at the mirror surface 462m may form an optical path which is indicated in FIG. 4 as a chain line. Referring to FIG. 4, the coherent backlight unit 400 according to the current exemplary embodiment may form a plurality of optical paths in the light guide plate 120. Accordingly, although a diameter of the coherent light entering into the first diffraction grating 130 is relatively small, an area of the coherent light that reaches the second diffraction grating 140 may be relatively wide.

Figure 5:
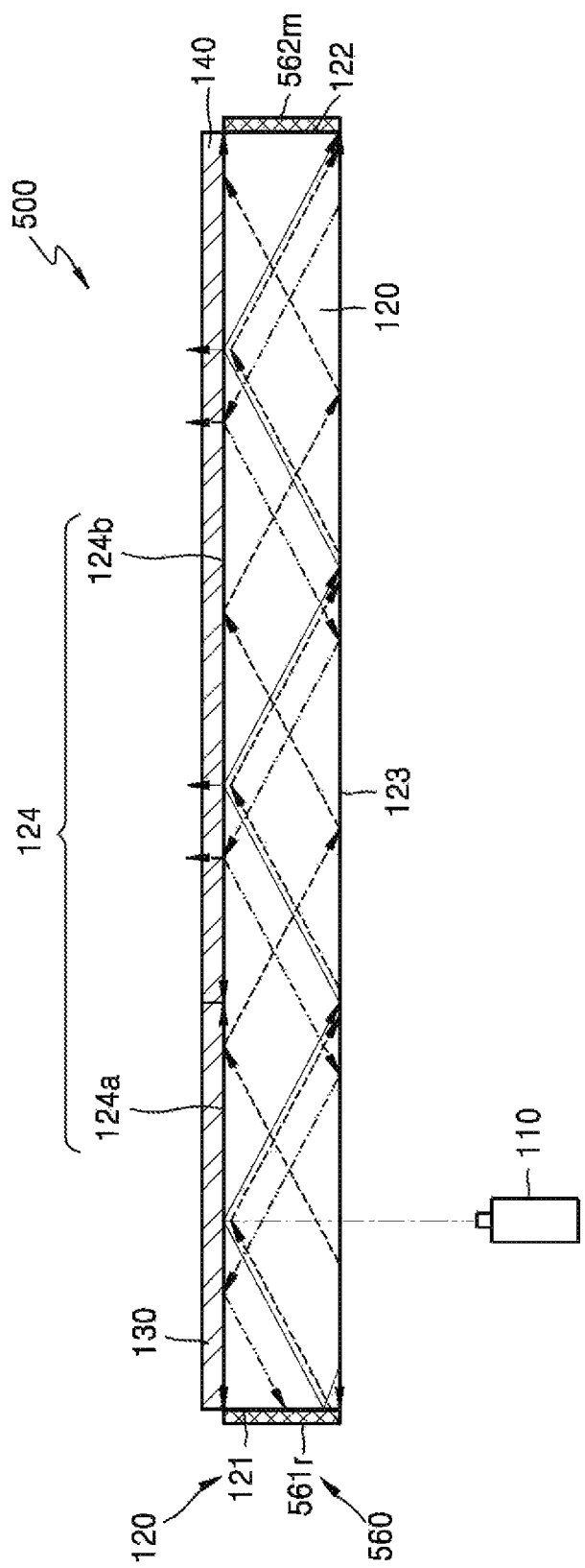
FIG. 5 is a schematic cross-sectional view of a coherent backlight unit, according to another exemplary embodiment.

FIG. 5 is a schematic cross-sectional view of a coherent backlight unit 500, according to another exemplary embodiment. Referring to FIG. 5, a retro-reflective surface 561r may be provided on the first side surface 121, and a mirror surface 562m may be provided on the second side surface 122. The configuration of the coherent backlight unit 500 according to the current exemplary embodiment is substantially the same as the coherent backlight unit 100 of FIGS. 1A and 1B except for the retro-reflective surface 561r and the mirror surface 562m, and thus, the detailed descriptions thereof will not be repeated.

The retro-reflective surface 561r on the first side surface 121 and the mirror surface 562m on the second side surface 122 may prevent light from leaking through side surfaces, and thus, may increase optical efficiency of the coherent backlight unit 500. The coherent backlight unit 500 according to the current exemplary embodiment may form a plurality of optical paths in the light guide plate 120.

Figure 6:
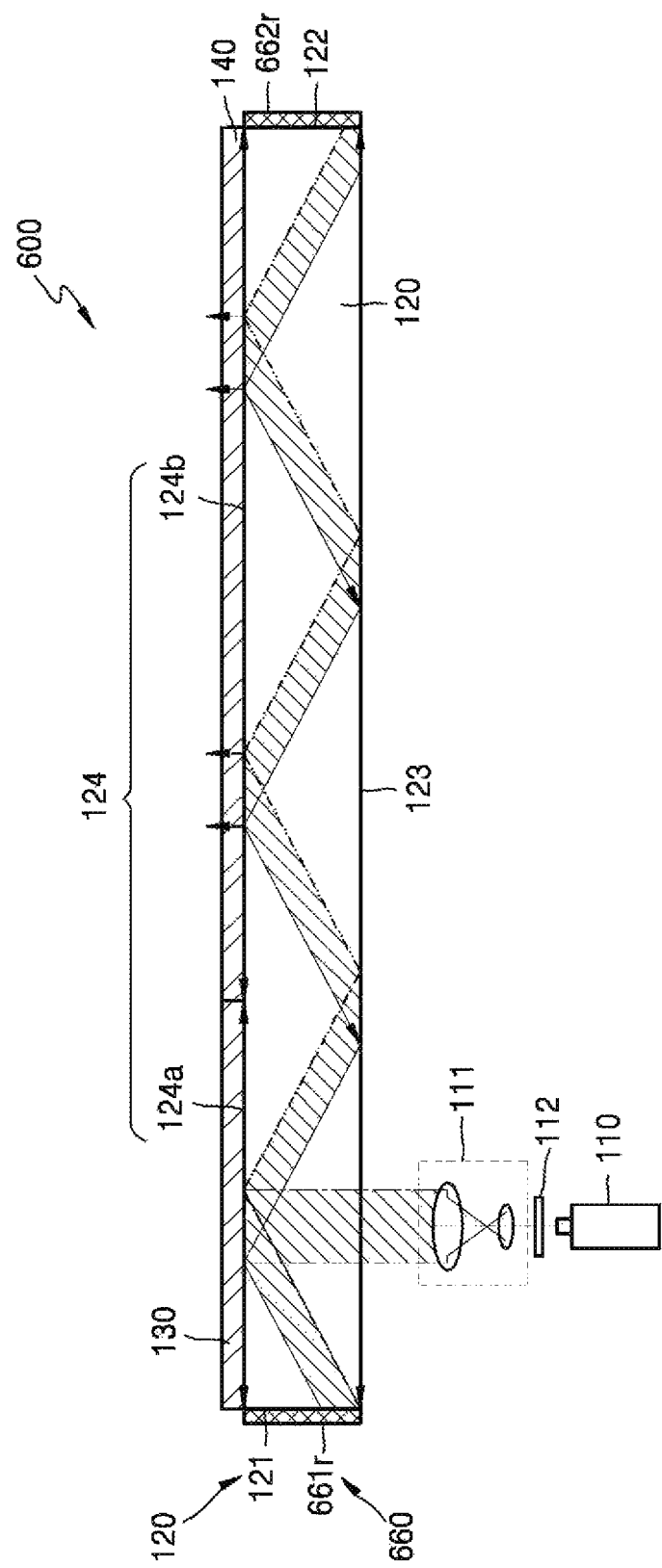
FIG. 6 is a schematic cross-sectional view of a coherent backlight unit, according to another exemplary embodiment.

FIG. 6 is a schematic cross-sectional view of a coherent backlight unit 600, according to another exemplary embodiment. Referring to FIG. 6, a retro-reflective surface 661r may be provided on the first side surface 121 and a retro-reflective surface 662r may be provided on the second side surface 122. The coherent backlight unit 600 may include a beam expander 111 and a collimator 112 disposed in front of the light source 110. The configuration of the coherent backlight unit 600 according to the current exemplary embodiment is substantially the same as the coherent backlight unit 300 of FIG. 3 except the beam expander 111 and the collimator 112, and thus, the detailed descriptions thereof will not be repeated.

The beam expander 111 may increase a region of a coherent light that reaches the first region 124a and the second region 124b of the first flat panel surface 124 by expanding the diameter of the coherent light. As described above with reference to FIG. 3, when the retro-reflective surfaces 661r and 662r are included on the first and second side surfaces 121 and 122, a single optical path may be formed in the light guide plate 120. When a single optical path is formed in the light guide plate 120, a coherent light may not reach a portion of the second region 124b. Referring to FIG. 6, when a diameter of the coherent light is expanded, the coherent light that is totally reflected may enter the second region 124b with a wider area. Accordingly, the portion of the second region 124b to which the coherent light does not reach may be reduced, and thus, the uniformity of a hologram image irradiated from a holographic display 600 may be ensured. For example, when the diameter of the coherent light is sufficiently expanded, the coherent light may reach the entire region of the second region 124b. The beam expander 111 may have a well-known configuration, and thus, a detailed description thereof will be omitted.

The collimator 112 may prevent the diffusion of a coherent light and may maintain a constant wavefront. The collimator 112 may have a well-known configuration, and thus, a detailed description thereof will be omitted.

Figure 7:
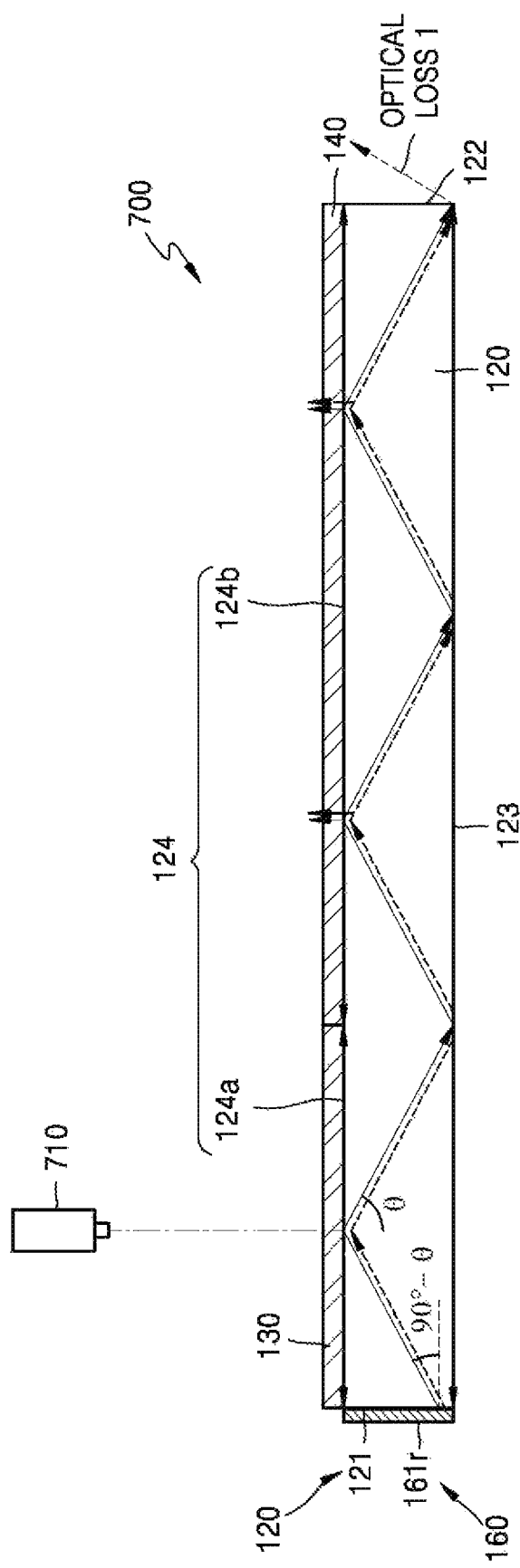
FIG. 7 is a schematic cross-sectional view showing a relationship between an incidence angle and an exit angle of the coherent backlight unit of FIG. 6.

FIG. 7 is a schematic cross-sectional view of a coherent backlight unit 700, according to another exemplary embodiment. Referring to FIG. 7, a light source 710 may be provided on a first diffraction grating 130. The configuration of the coherent backlight unit 700 according to the current exemplary embodiment is substantially the same as the coherent backlight unit 100 of FIGS. 1A and 1B except for the first diffraction grating 130, and thus, the detailed descriptions thereof will not be repeated.

The light source 710 may irradiate a coherent light onto the first diffraction grating 130. For example, the light source 710 may be disposed within relatively close proximity to the first diffraction grating 730. The beam expander 111 and the collimator 112 may be additionally provided so as to be disposed in front of the light source 710. Unlike the exemplary embodiments described above, the first diffraction grating 130 may not need a reflective coating.

In the current exemplary embodiment, the description of the location of the light source 710 is premised on the assumption that the retro-reflective surface 161r is provided on one of the side surfaces 121, 122, 125, and 126 of FIG. 1B for convenience of explanation. In the cases of the coherent backlight units 100, 200, 300, 400, 500, and 600 described above, the light source 710 may be located on the first diffraction grating 130.

Figure 8:
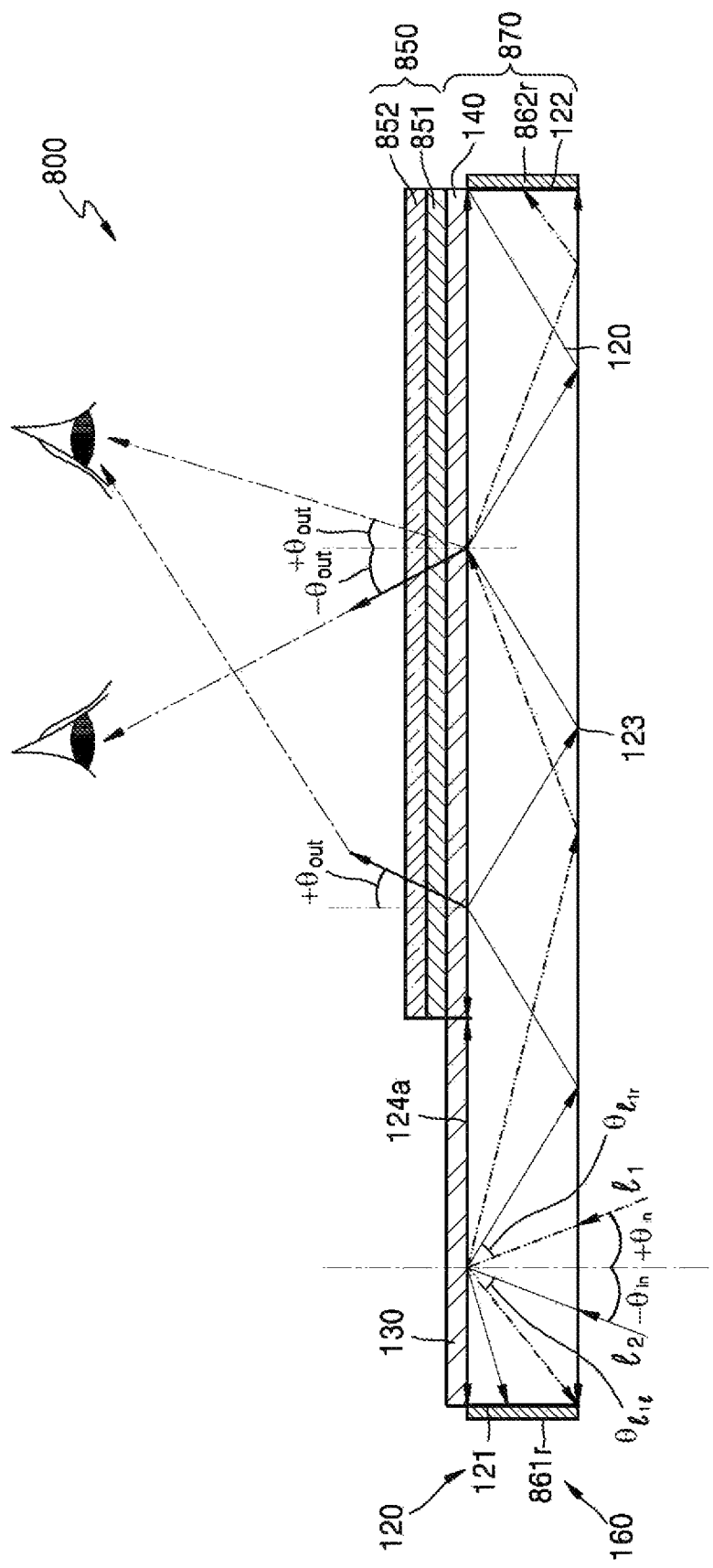
FIG. 8 is a schematic cross-sectional view of a 3D image display device, according to another exemplary embodiment.

FIG. 8 is a schematic cross-sectional view of a 3D image display device 800, according to another exemplary embodiment. The 3D image display device 800 according to the current exemplary embodiment may include a coherent backlight unit 870 and a display panel 850. The coherent backlight unit 870 according to the current exemplary embodiment may include a retro-reflective surface 861r provided on the first side surface 121 and a retro-reflective surface 862r provided on the second side surface 122. The coherent light may be irradiated by changing an angle of incidence.

The configuration of the coherent backlight unit 870 according to the current exemplary embodiment is substantially the same as the coherent backlight unit 100 of FIGS. 1A and 1B except for the retro-reflective surfaces 861r and 862r and a light source (not shown), and thus, the detailed descriptions thereof will not be repeated.

The 3D image display device 800 according to the current exemplary embodiment displays a 3D image based on a binocular parallax. The 3D image display device 800 respectively provides a left-eye image and a right-eye image having different viewpoints from each other to a left eye and a right eye of a viewer in order to enable the viewer to feel a 3D effect. For example, the 3D image display device 800 may change an exit angle of a coherent light to $-\theta_{out}$ and $+\theta_{out}$ in the second region 124b. For example, the 3D image display device 800 may irradiate a coherent light that has an exit angle of $-\theta_{out}$ to a left-eye of a viewer and a coherent light that has an exit angle of $+\theta_{out}$ to a right-eye of the viewer. Alternatively, the 3D image display device 800 may irradiate a coherent light that has an exit angle of $-\theta_{out}$ to the right-eye of a viewer and a coherent light that has an exit angle of $+\theta_{out}$ to the left-eye of the viewer.

The 3D image display device 800 according to the current exemplary embodiment may control an exit angle of a coherent light that is discharged via the second first diffraction grating 140 to be constant by controlling an entrance angle of the coherent light. The controlling of the exit angle to be constant according to the entrance angle is referred to as steering. For example, a light source 810 may control an exit angle by repeating and changing an entrance angle of $-\theta_{in}$ and $+\theta_{in}$ with respect to a perpendicular direction with respect to the first region 124a of the light guide plate 120. Referring to FIG. 8, the light source 810 may irradiate a coherent light with an entrance angle of $-\theta_{in}$, and at this point, an exit angle of the coherent light discharged from the second diffraction grating 140 may be $-\theta_{out}$. Referring to FIG. 8, the light source 810 may irradiate a coherent light with an entrance angle of $+\theta_{in}$, and at this point, an exit angle of the coherent light discharged from the second diffraction grating 140 may be $-\theta_{out}$. For example, $\theta_{in}$ and $\theta_{out}$ may be the same. The 3D image display device 800 that satisfies the above conditions may be a backlight apparatus that illuminates a directional light.

The location of a light source (not shown) may be changed so that $-\theta_{in}$ and $+\theta_{in}$ are different.

The steering operation may have a condition that a coherent light formed in the light guide plate 120 has a single optical path. For example, in order to create a single optical path in the light guide plate 120, at least one retro-reflective surface may be provided on the first, second, third, and fourth side surfaces 121, 122, 125, and 126 of FIG. 1B and no mirror surface may be provided. For example, a retro-reflective surface 862r may be provided on the second side surface 122. For example, in the case of an opened state in which a retro-reflective surface 861r is provided on the first side surface 121 and the retro-reflective surface 862r is not provided on the second side surface 122, a steering operation is possible, but a coherent light that enters the second side surface 122 may be leaked to the outside. In this case, an optical efficiency of the 3D image display device 800 may be reduced.

When a coherent light having an entrance angle $+\theta_{in}$ is referred to as a coherent light $I_1$, a coherent light $I_{1r}$ that diffracts in a right side direction is diffracted with an angle of $\theta_{n1r}$ and a coherent light $I_{1l}$ that diffracts in a left side direction is diffracted with an angle of $\theta_{n1l}$ with respect to a vertical line to the first region 124a. Referring to FIG. 8, $\theta_{n1r}$ and $\theta_{n1l}$ may not be the same.

For example, if not a mirror surface 461m (referring to FIG. 4) but the retro-reflective surface 861r is provided on the first side surface 121, a coherent light $I_{1r}$ diffracted to the right side and a coherent light $I_{1l}$ diffracted to the left side with respect to the coherent light $I_1$ may enter the second flat panel surface 123 or the second region 124b via respective optical paths having different entrance angles from each other. As a result, exit angles of the coherent light discharged from the second diffraction grating 140 may be different. At this point, an image of the 3D image display device 800 to be seen by a viewer may be degraded.

For example, if the retro-reflective surface 861r is provided on the first side surface 121, a coherent light may be reversibly reflected on the same optical path, and thus, the optical paths of $I_{1l}$ and $I_{1r}$ in the light guide plate 120 may not be the same. Accordingly, although the diffraction angles $\theta_{n1r}$ and $\theta_{n1l}$ are not the same, the coherent light $I_{1l}$ and $I_{1r}$ may enter the second diffraction grating 140 with the same entrance angle. Accordingly, the exit angles may also be the same. This will be the same with respect to an entrance light $I_2$ having an entrance angle $-\theta_{in}$. An optical path of the entrance light $I_2$ is substantially the same as the entrance light $I_1$, and thus, the description of the optical path of the entrance light $I_2$ will be omitted for convenience of explanation.

The 3D image display device 800 according to the current exemplary embodiment may further include the beam expander 111 (referring to FIG. 6) and a collimator 112 (referring to FIG. 6) disposed in front of the light source 810.

The display panel 850 may include a display element layer 852 that modulates a coherent light discharged from the second diffraction grating 140 in response to a reception of image information and a lens 851 that is configured for focusing the coherent light discharged from the second diffraction grating 140. For example, the lens 851 may be a convex lens. The lens 851 may focus a coherent light so as to provide a left-eye image and a right-eye image that are different from each other to a left eye and a right eye of a viewer according to the change of an exit angle of the coherent light discharged from the second diffraction grating 140.

The coherent backlight unit 300 according to the current exemplary embodiment may be driven by a time division method or a spatial division method.

Figure 9:
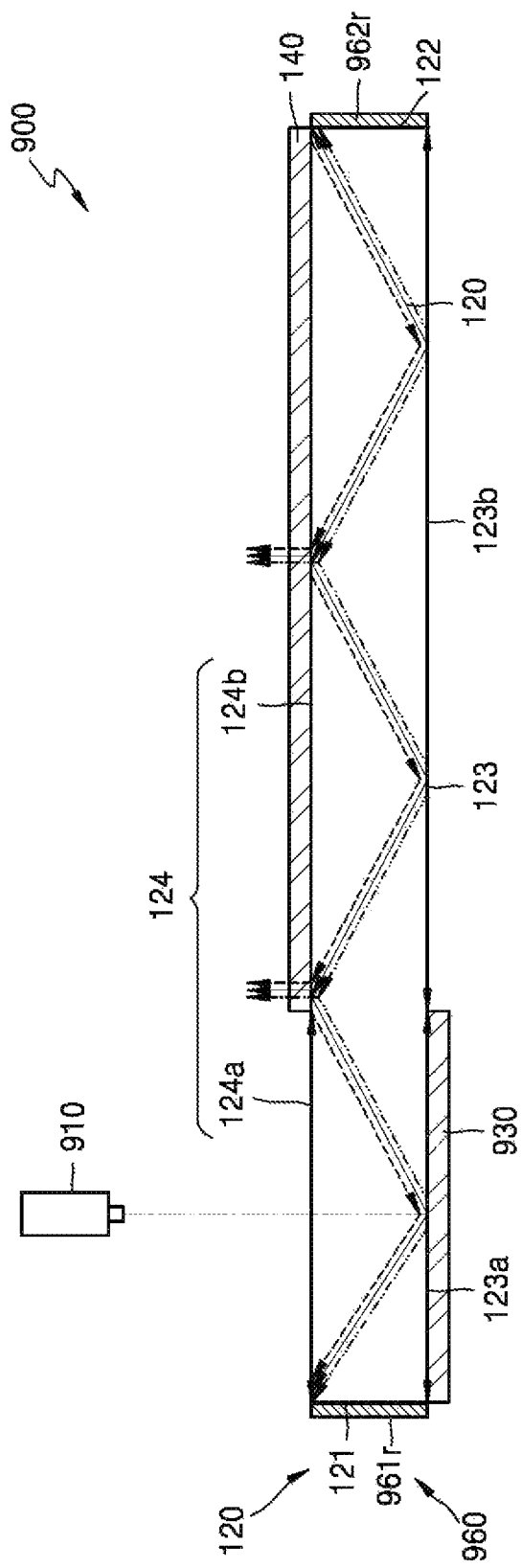
FIG. 9 is a schematic cross-sectional view of a coherent backlight unit, according to another exemplary embodiment.

FIG. 9 is a schematic cross-sectional view of a coherent backlight unit 900, according to another exemplary embodiment. Referring to FIG. 9, a first diffraction grating 930 may be provided on the second flat panel surface 123. For example, the first diffraction grating 930 may be provided on a third region 123a of the second flat panel surface 123. The third region 123a is illustrated to face and have the same area as the first region 124a, but the current exemplary embodiment is not limited thereto. In particular, the third region 123a and the first region 124a may have different areas from each other.

The second diffraction grating 140 may be provided to face the first diffraction grating 930 on the first flat panel surface 124. For example, the second diffraction grating 140 may be provided on the first region 124a.

A light source 910 may irradiate a coherent light with respect to the first diffraction grating 930. The light source 910 may be provided above the third region 123a or above the first region 124a.

The coherent backlight unit 900 may include retro-reflective surfaces 961r and 962r on both side surfaces thereof. This is only an example, and as an alternative, the coherent backlight unit 900 may include a mirror surface.

In short, the first diffraction grating 930 and the second diffraction grating 140 may be provided in various ways on flat panel surfaces and side surfaces of the light guide plate 120, and the locations of the first diffraction grating 930 and the second diffraction grating 140 are not limited thereto. However, when taking practicality into consideration with respect to use of the coherent backlight unit 900, it is more effective that the first diffraction grating 930 and the second diffraction grating 140 are provided on the first flat panel surface 124 and the second flat panel surface 123 that have relatively large areas.

In the coherent backlight units 100, 200, 300, 400, 500, 600, 700 and 800 illustrated in FIGS. 1A through 8, similarly as the coherent backlight unit 900 according to the current exemplary embodiment, the first diffraction grating and the second diffraction grating may be located on different flat panel surfaces from each other.

Figure 10:
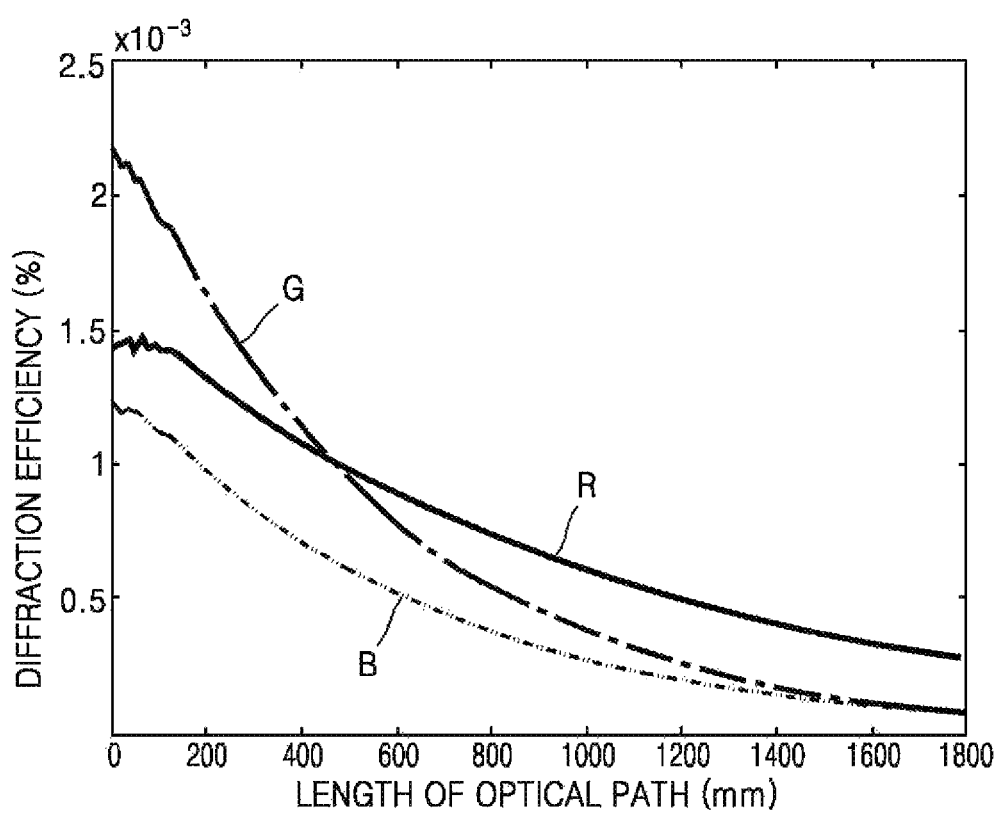
FIG. 10 is a graph showing diffraction efficiency of a coherent backlight unit according to a length of an optical path.

FIG. 10 is a graph showing diffraction efficiency according to a length of an optical path. Referring to FIG. 10, the x-axis indicates a length in millimeters (mm) of an optical path of a coherent light formed in the light guide plate 120, and the y-axis indicates diffraction efficiency as a percentage (%). The longer the length (mm) of an optical path formed in the light guide plate 120, the lower the diffraction efficiency (%). When the length (mm) of the optical path is increased due to the introduction of the reflective optical element 160 (referring to FIGS. 1A and 1B), the diffraction efficiency (%) is accumulated, and thus, optical efficiency of the coherent backlight unit may be increased.

Figure 11:
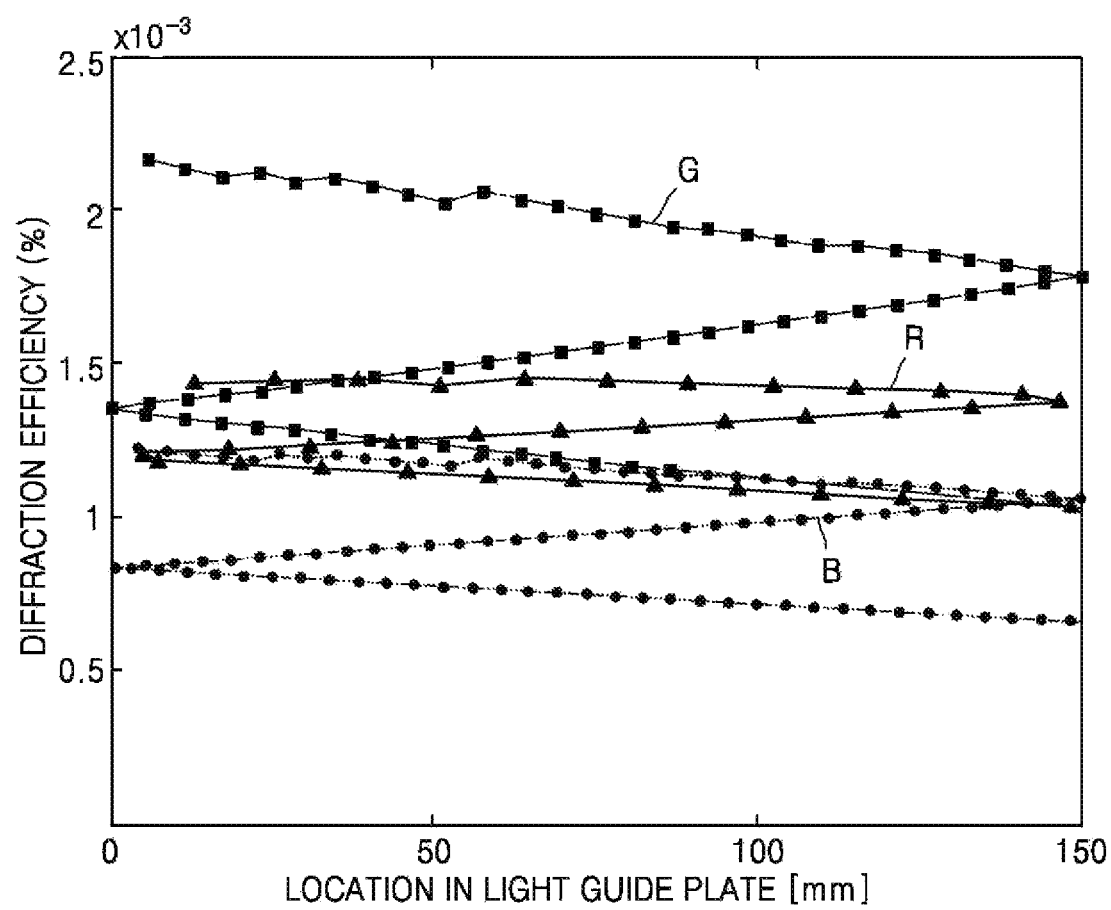
FIG. 11 is a graph showing diffraction efficiency of a coherent backlight unit according to a location of a light guide plate.

FIG. 11 is a graph showing diffraction efficiency according to a location of a light guide plate. The x-axis indicates a location in millimeters (mm) in the light guide plate 120 through which a coherent light propagates, and the y-axis indicates diffraction efficiency as a percentage (%). The introduction of the reflective optical elements 160 (referring to FIGS. 1A and 1B) increases the length (mm) of an optical path. As a result, the diffraction efficiency (%) is increased, and thus, the optical efficiency of the coherent backlight unit may be increased. Referring to FIG. 11, the portions of graphs that are re-bent at a location of an optical path of 150 mm with respect to light of wavelengths of red light (R), green light (G), and blue light (B), respectively correspond to an optical gain due to the introduction of the reflective optical elements 160 (referring to FIGS. 1A and 1B).

The optical efficiency of a coherent backlight apparatus and a 3D image display device including the same may be increased by use of a retro-reflective surface or a mirror surface as a reflective optical element.

A coherent backlight apparatus and a 3D image display device including the same and a retro-reflective surface may control an exit angle of a coherent light by controlling an entrance angle of the coherent light.

A coherent backlight apparatus and a 3D image display device that includes the coherent backlight apparatus and a mirror surface may have a uniform image output due to use of a coherent light that has a relatively small diameter.

While one or more exemplary embodiments have been described with reference to the figures, it will be understood by those of ordinary skill in the art that various changes in form and details may be made therein without departing from the spirit and scope as defined by the following claims.

What is claimed is:

1. A coherent backlight apparatus comprising:
    a light source configured to radiate a coherent light;
    a light guide plate comprising:
        a first flat panel surface and a second flat panel surface that are disposed to oppose each other, and
        a first diffraction grating provided on the first flat panel surface, and configured to diffract the coherent light that is radiated from the light source and passes through the second flat panel surface, toward an inner side of the light guide plate;
    at least one reflective optical element provided on at least one from among a plurality of side surfaces of the light guide plate and configured to reflect the coherent light that propagates toward the at least one from among the plurality of side surfaces from the inner side of the light guide plate, toward the inner side of the light guide plate; and
    a second diffraction grating provided on the second flat panel surface that opposes the first flat panel surface on which the first diffraction grating is disposed, and configured to allow the coherent light that is totally reflected by the light guide plate to pass through the second diffraction grating and discharge to an outside of the light guide plate,
    wherein the first diffraction grating provided on the first flat panel surface is disposed not to face the second diffraction grating provided on the second flat panel surface that opposes the first flat surface, and a sum of a length of first diffraction grating and a length of the second diffraction grating is equal to a length of the light guide plate,
    the at least one reflective optical element comprises a first retro-reflective optical element and a second retro-reflective optical element that are disposed on two opposing side surfaces of the light guide plate, and
    the first diffraction grating and the first retro-reflective optical element share a same corner point of the light guide plate, and the second diffraction grating and the second retro-reflective optical element share another same corner point of the light guide plate.

2. The coherent backlight apparatus of claim 1, wherein the light source is positioned so that the coherent light enters the light guide plate through the second flat panel surface that faces the first flat panel surface of the light guide plate.

3. The coherent backlight apparatus of claim 1, wherein the first diffraction grating is positioned within a predetermined threshold distance from the second diffraction grating.

4. The coherent backlight apparatus of claim 1, wherein each of the first diffraction grating and the second diffraction grating is formed so that an entrance angle of the coherent light with respect to the light guide plate corresponds to an exit angle of the coherent light discharged from the second diffraction grating.

5. The coherent backlight apparatus of claim 4, wherein the second diffraction grating is further configured such that when the light source radiates the coherent light to be perpendicular to the first diffraction grating, the coherent light is discharged by the second diffraction grating toward the outside of the light guide plate.

6. The coherent backlight apparatus of claim 4, wherein, when the light source radiates the coherent light at the entrance angle between $-\theta_{in}$ and $+\theta_{in}$ with respect to a perpendicular direction with respect to the first flat panel surface and the second flat panel surface of the light guide plate, the exit angle of the coherent light discharged via the second diffraction grating is between $-\theta_{out}$ and $+\theta_{out}$.

7. The coherent backlight apparatus of claim 6, wherein when the entrance angle of the coherent light is $-\theta_{in}$, the exit angle of the coherent light is $-\theta_{out}$, and when the entrance angle of the coherent light is $+\theta_{in}$, the exit angle of the coherent light is $+\theta_{out}$.

8. The coherent backlight apparatus of claim 6, wherein the backlight apparatus is configured to satisfy a condition of $\theta_{in}=\theta_{out}$.

9. A 3D image display device comprising:
    the coherent backlight apparatus of claim 4; and
    a display panel.

10. The 3D image display device of claim 9, wherein the display panel comprises:
- a display element layer configured to modulate the coherent light discharged from the coherent backlight apparatus in response to a reception of image information; and
- a lens configured to focus the coherent light and to provide a left-eye image and a right-eye image, which are different from each other, to a left eye and a right eye of a viewer, respectively, according to the exit angle of the coherent light discharged from the coherent backlight apparatus.

11. The coherent backlight apparatus of claim 1, wherein the light source comprises a red color light source, a blue color light source, and a green color light source.

12. The coherent backlight apparatus of claim 1, further comprising a collimator disposed in front of the light source.

13. The coherent backlight apparatus of claim 1, further comprising a beam expander disposed in front of the light source.

14. A 3D image display device comprising:
- the coherent backlight apparatus of claim 1; and
- a display panel.

15. The 3D image display device of claim 14, wherein the display panel comprises:
- a display element layer configured to modulate the coherent light discharged from the coherent backlight apparatus in response to a reception of image information; and
- a lens configured to form a viewing window by focusing the coherent light.

* * * * *